United States Patent
Swenson et al.

(10) Patent No.: US 9,154,361 B2
(45) Date of Patent: Oct. 6, 2015

(54) JUST-IN-TIME DISTRIBUTED VIDEO CACHE

(71) Applicant: Opera Software Ireland Limited, Dublin (IE)

(72) Inventors: Erik R. Swenson, San Jose, CA (US); Jaime Heilpern, San Francisco, CA (US); Sandeep Pombra, Los Altos, CA (US); Ron Earley, Dublin, CA (US); Vadim Arshanskiy, Santa Clara, CA (US)

(73) Assignee: Opera Software Ireland Limited, Dublin (IE)

( * ) Notice: Subject to any disclaimer, the term of this patent is extended or adjusted under 35 U.S.C. 154(b) by 42 days.

(21) Appl. No.: 13/945,747

(22) Filed: Jul. 18, 2013

(65) Prior Publication Data

US 2014/0025837 A1    Jan. 23, 2014

Related U.S. Application Data

(60) Provisional application No. 61/673,188, filed on Jul. 18, 2012.

(51) Int. Cl.
*G06F 15/16* (2006.01)
*H04L 29/06* (2006.01)
(Continued)

(52) U.S. Cl.
CPC .... *H04L 29/06027* (2013.01); *G06F 17/30781* (2013.01); *H04L 65/4084* (2013.01);
(Continued)

(58) Field of Classification Search
CPC .................. G06F 17/30902; G06F 17/30097; G06F 17/30132; H04L 29/06027; H04L 29/08729; H04L 29/08756; H04L 29/08801; H04L 67/28; H04L 67/2842; H04L 67/2852; H04L 65/4084; H04L 67/02; H04L 67/04; H04L 67/2828; H04L 12/5895
USPC .......................................... 709/231
See application file for complete search history.

(56) References Cited

U.S. PATENT DOCUMENTS 6,954,456 B2 * 10/2005 Cranor et al. ................. 370/356
7,188,216 B1 *  3/2007 Rajkumar et al. ............ 711/118
(Continued)

FOREIGN PATENT DOCUMENTS

WO    WO 2011/106009 A1    9/2011

OTHER PUBLICATIONS

Bhandarkar et al. "Collaborative Caching for Efficient Dissemination of Personalized Video Streams in Resource Constrained Environments." MMSys'12 Feb. 22-24, 2012, Chapel Hill, North Carolina, USA. pp. 185-190.*

(Continued)

*Primary Examiner* — Christopher Biagini
(74) *Attorney, Agent, or Firm* — Fenwick & West LLP

(57) ABSTRACT

A video optimizer receives a request to optimize a source file and stream the optimized file. The request may be accompanied by a key uniquely identifying the original source file to be optimized and an optimized version of the source file to stream to the client. The key uniquely identifies the source video file as it exists on an origin server to prevent transmission of modified source video and the optimized version of the source file by optimization parameters to ensure compatibility with the user device. The video optimizer queries a cache database in response to the received request, which contains references keys and locations of optimized source files among local caches in a cluster of video optimizers. The cache database responds indicates whether a matching optimized version of the source file exists in a local cache of a given video optimizer in the cluster.

14 Claims, 7 Drawing Sheets

(51) Int. Cl.

| | | |
|---|---|---|
| *G06F 17/30* | (2006.01) | |
| *H04N 21/231* | (2011.01) | |
| *H04N 21/2343* | (2011.01) | |
| *H04N 21/239* | (2011.01) | |
| *H04N 21/222* | (2011.01) | |
| *H04N 21/647* | (2011.01) | |
| *H04W 4/18* | (2009.01) | |
| *H04L 29/08* | (2006.01) | |

(52) U.S. Cl.
CPC ............. *H04L65/80* (2013.01); *H04N 21/222* (2013.01); *H04N 21/2396* (2013.01); *H04N 21/23103* (2013.01); *H04N 21/23106* (2013.01); *H04N 21/23439* (2013.01); *H04N 21/64784* (2013.01); *H04L 67/2842* (2013.01); *H04W 4/18* (2013.01)

(56) References Cited

U.S. PATENT DOCUMENTS

| | | | | |
|---|---|---|---|---|
| 8,639,718 | B2* | 1/2014 | Bhupalam et al. | 707/771 |
| 2003/0217169 | A1* | 11/2003 | James et al. | 709/231 |
| 2004/0098463 | A1* | 5/2004 | Shen et al. | 709/213 |
| 2006/0190616 | A1* | 8/2006 | Mayerhofer et al. | 709/231 |
| 2007/0174471 | A1 | 7/2007 | Van Rossum | |
| 2008/0139191 | A1* | 6/2008 | Melnyk et al. | 455/419 |
| 2008/0288722 | A1* | 11/2008 | Lecoq et al. | 711/130 |
| 2009/0006643 | A1* | 1/2009 | Lee | 709/231 |
| 2010/0106770 | A1* | 4/2010 | Taylor et al. | 709/203 |
| 2011/0131298 | A1* | 6/2011 | Courtemanche et al. | 709/219 |
| 2011/0280216 | A1 | 11/2011 | Li et al. | |
| 2012/0030212 | A1 | 2/2012 | Koopmans et al. | |
| 2012/0131138 | A1 | 5/2012 | Swenson et al. | |
| 2012/0203861 | A1* | 8/2012 | Flack et al. | 709/217 |

OTHER PUBLICATIONS

Singh et al. "PTC: Proxies that Transcode and Cache in Heterogeneous Web Client Environments." World Wide Web: Internet and Web Information Systems, vol. 7. 2004. pp. 7-28.*

U.S. Appl. No. 61/334,548, filed May 13, 2010, Inventors S. Li et al.

Li, Y. et al., "Optimized Cache Management for Scalable Video Streaming," Proceedings of the 15th International Conference on Multimedia, ACM, 2007, 4 pages, [Online] [Retrieved on Dec. 30, 2013] Retrieved from the Internet<URL:http://dl.acm.org/citation.cfm?id=1291414>.

PCT International Search Report and Written Opinion, PCT Application No. PCT/US13/51126, Jan. 24, 2014, 14 pages.

* cited by examiner

JUST-IN-TIME DISTRIBUTED VIDEO CACHE

CROSS REFERENCE TO RELATED APPLICATIONS

This application claims the benefit of U.S. Provisional Application No. 61/673,188 filed on Jul. 18, 2012, which is incorporated by reference herein in its entirety.

BACKGROUND

1. Field of Art

The disclosure generally relates to improving user experience on a network, and more specifically, to optimizing video caching in a network.

2. Description of the Related Art

Mobile devices, such as smart phones and tablets, have become prevalent in recent years. Given the advances in mobile computing power and far-reaching wireless Internet access, more and more users view streamed videos on their mobile devices. These streamed videos are often streamed at varying qualities, frame rates, frame sizes and compression levels from the various sources users access with their mobile devices. In many cases, videos available on the network are not optimized for wireless transmission or viewing on mobile devices and are streamed at a given quality from the source agnostic to network conditions. For example, an unoptimized video may have a quality level sufficient to provide users with a good viewing experience on a computer monitor or television. As a result, an unnecessarily large portion of bandwidth may be used to stream an unoptimized video when a smaller portion would suffice for providing an equivalent user viewing experience on the smaller display of the mobile device.

Existing network providers or media sources have attempted to improve the bandwidth usage during video streaming by performing a video optimization on the streamed video. Optimization often involves transcoding a source file such as a video into a format that more closely fits the capabilities of mobile devices or the network provider's system. While optimization does improve the bandwidth usage with little impact on the quality of the streamed video as viewed on a mobile device, the optimization process usually causes a delay in video streaming and playback as servers begin the transcoding process. These delays ultimately cause an adverse effect on the user's viewing experience, which may lead to the user stopping the video streaming early or switching to another streaming site.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
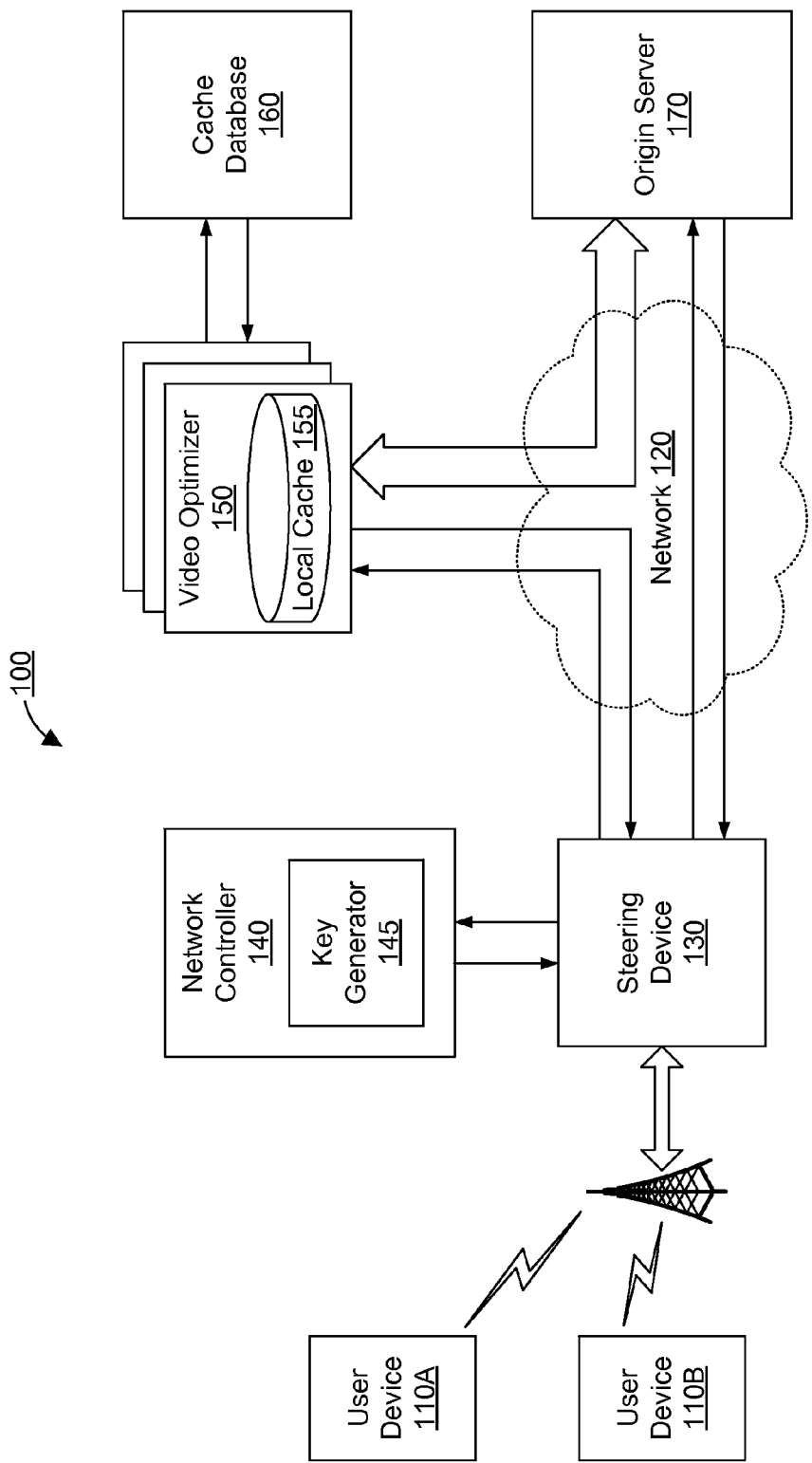
FIG. 1 illustrates a high-level block diagram of an example communications environment for optimized video caching.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Network providers and media sources may use local caching as a method for improving the streaming quality of source files such as video to mobile devices. When a source file is transcoded and optimized by a video optimizer, for example, it may be saved into a local cache. Local caching allows the video optimizer to store the transcoded source file (or optimized version of the source file) for a short duration and respond to a user's requests (e.g., replaying the video or skipping in the timeline of the video) without having to re-retrieve the source file for transcoding. Thus, the local cache configuration avoids repeatedly retrieving and transcoding a particular file for a particular user during a single session.

Typically, however, the transcoded file is purged from the local cache shortly after the user ends the session. Purging takes place for two main reasons: in order to allow the local caching of other files during transcoding for other users and to avoid copyright violations. The latter results from the video optimizer storing (and streaming) an optimized version of a copyrighted file that is no longer available from the copyright holder. This opens the transcoding service provider up to unwanted liability. Even if cached files are not purged, a user has to be fortunate enough to be routed to a particular video optimizer, out of potentially thousands, having cached the optimized source file. Otherwise, the user has to wait through the same transcoding operation as the user who had previously streamed the video from another video optimizer.

Embodiments disclosed herein include a cache database for monitoring local caching of optimized video occurring at numerous video optimizers. The cache database maintains entries corresponding to each optimized video locally cached at a given optimizer. In turn, when a user requests the optimization of a given source file on a source server at a video optimizer, the cache database is able to provide the video optimizer with the locations and addresses of other optimizers that have previously optimized and stored the given source file in their local cache. The optimizer receiving the optimization request for the source file may then retrieve the optimized file from another optimizer or redirect the user device to the second optimizer, thus eliminating the need to generate redundant optimized source files. By accessing existing optimized source files rather than repeatedly transcoding the same source files, fewer video optimizers are needed to provide resource heavy transcoding operations.

In an example embodiment, when a user device requests a source file from an origin server storing a plurality of source files, a steering device may detect the request and intercept the request for processing at a network controller. The network processor is capable of gathering network data about network flows as they traverse the network, redirecting requests and other data to optimize the bandwidth usage in the network. In one embodiment, the network controller inspects the request and related traffic (i.e., a network flow) to determine information about the source file, the state of the network, and the user device. Additionally, the network controller may forward the request for the source file to an origin server and intercept the origin server's response to determine whether the source file corresponds to a video. The intercepted request and/or response may contain video information or a portion of the source file itself.

The network controller processes the information to determine whether to transcode the requested source file and determine optimization parameters for transcoding the source file for the user device. The network controller may generate an identifier (ID) key uniquely associated with both the original source file and the optimized source file (e.g., based on the specified optimization parameters). In turn, the network controller may redirect the user device to a video optimizer. In one embodiment, the network controller includes the ID key within a redirect request transmitted to the user device. Alternatively, the network controller may transmit the ID key to the video optimizer that the user device was redirected to. By sending the ID key and redirecting the user device to a video optimizer for retrieving the source video file, the user may receive an optimized version of the source file without direct input or even knowing the process occurs.

To eliminate the need to re-transcode a source file that has already been transcoded, the video optimizer may query its local cache and/or a cache database storing reference ID keys corresponding to optimized versions of source files stored on video optimizers reporting to the cache database. If a reference ID key matches the ID key for the requested source file, an existing optimized version of the source file may be provided to the user device. Importantly, the ID key uniquely identifies both the source file and the optimized source file. If there are any changes to the source file, no reference keys will match the generated ID key and a new source video file will be retrieved and transcoded. Thus, for example, if a copyright owner of the source file modifies the source file, only optimized versions of the source file as currently available from the copyright holder are provided to the user device. Matching of the optimized version of the source file to the specified optimization parameters for the user device requesting the source file ensures that an appropriately optimized version (as there may be more than one, e.g., for a tablet display size as opposed to that of a mobile phone or 4G connection speed as opposed to that of a 3G connection) is provided to the user device.

In an embodiment, the source file has not been previously transcoded or transcoded based on the specified optimization parameters and thus an optimized version of the source file meeting the needs of the user device does not exist on any of the video optimizers. Accordingly, the ID key will not match any reference key in the cache database. The cache database returns a cache miss indication to the video optimizer querying the cache database with the ID key, which prompts the video optimizer to retrieve the source file from the origin server and begin transcoding and streaming the source file to the user. Once at least a portion of the optimized source file is cached in the video optimizer, the video optimizer may update the cache database with an entry corresponding to the portion of the optimized source file now locally cached on the video optimizer. In one embodiment, the video optimizer submits the ID key received from the network controller for storage in the cache database as a new reference key uniquely identifying the source file and the parameters of the optimized version of the source file stored in the local cache of the video optimizer. Other video optimizers querying the cache database with an ID key matching the stored reference key for the same portion of the source file may be referred to the existing optimized version of the source file stored in the local cache of the video optimizer instead of having to re-transcode the same portion of the source file.

In another example embodiment, the source file has already been previously transcoded by another optimizer and an optimized version having the desired parameters is stored in a local cache of one of the other optimizers. The cache database sends a cache hit indication to the video optimizer querying the cache database with the ID key. The cache hit response indicates a second video optimizer has an optimized version of the source file with a reference key matching the specified optimization parameters in the ID key in its local cache. In one instance, the optimizer may request the optimized source file from the second optimizer that has locally cached the optimized version of the source file. The first optimizer then may forward the optimized video to the user device for playback. In another instance, the first optimizer may send a redirect to the user device. The redirect causes the user device to connect to the second video optimizer storing the optimized version of the source file. The redirect may include the location of the second optimizer on the network and the generated ID key. In this instance, the second optimizer responds by directly streaming the optimized version of the source file to the user device.

In some instances, a popular source file may be frequently requested by many users. In response to the increased demand for that particular source file, a video optimizer may request to duplicate an optimized version of the source file that exists on a second optimizer. By storing the optimized version of the frequently requested source file in the first optimizer, the first optimizer is able to share the request load for the source file with the second optimizer, thus reducing the burden on the second optimizer. The benefit is that both optimizers are able to offer the same optimized version of the source file and are able to respond more quickly to requests for the source file while still processing other source file optimization requests.

Optimized Video Caching Environment

Referring now to FIG. 1, it illustrates a high-level block diagram of an example communications environment 100 for optimized video caching. The environment 100 comprises user devices 110A and 110B (collectively referred to as user devices 110), an origin server 170, a steering device 130, a network controller 140, a video optimizer 150, a cache database 160 and a network 120. The network 120 is a communication network that transmits data between the user devices 110, the steering device 130 and the origin server 170 and/or the video optimizer 150. In one embodiment the network 120 includes wireless network and the Internet.

A network efficiency strategy that aspires to keep capital expenditure from outpacing revenues has to be balanced with demands from consumers for better user experiences that rely increasingly on higher data usage. Today, mobile operators are employing a variety of tools to manage capacity including data usage caps, Wi-Fi offload and intelligent optimization. The environment 100 demonstrates such a solution that provides a unified foundation with deep session intelligence, integrated services management, and dynamic adaptability to fit any service offering. Together, the network controller 140 and the video optimizer 150 deliver a world-class media optimization solution that brings a surgical capacity advantage to wireless operators as well as Internet service providers with better peak capacity savings than alternative solutions.

In one embodiment, the user devices 110 are computing devices with network capabilities. Oftentimes, for example, the user devices 110 are wireless enabled mobile computing device with a web browser and media display capability. The user devices 110 as mobile computing devices may include laptops, netbooks, tablets, smart telephones, or personal digital assistants (PDAs). While only two user devices 110A and 110B are illustrated in FIG. 1, the environment 100 may include thousands or millions of such devices. The web browsers may be software applications running on mobile devices 110 for retrieving source files comprising web content from the origin server 170 and presenting the web content on a display coupled to the mobile device. Multimedia web content accessed by the user devices 110 may include text, images, audio and video content. Source files may include one or more types of multimedia web content. The multimedia content can be played back by the browsers, for example, HTML5 compatible browsers, plug-in or a standalone media player. The browsers can also invoke the media players or plug-ins available on the user devices 110 and passes images, audio and/or video to the media player or plug-in for playback.

The steering device 130 may be a load balancer or a router located between the user device 110 and the network 120. The steering device 130 provides the user device 110 with access to the network and thus, provides the gateway through which the user device traffic flows onto the network and vice versa. In one embodiment, the steering device 130 categorizes traffic routed through it to identify flows of interest for further inspection at the network controller 140. Alternatively, the network controller 140 interfaces with the steering device 130 to coordinate the monitoring and categorization of network traffic, such as identifying large and small objects in HTTP traffic flows. In this case, the steering device 130 receives instructions from the network controller 140 based on the desired criteria for categorizing flows of interest for further inspection.

However, information on the wireless/cellular user devices 110 side is often not available at the steering device 130 that sits between the cellular network and the wired Internet. For example, there is often no information about the identifiers of the towers associated with the mobile devices 110. Tower association information only broadcasted when the mobile devices first attached to the network. In addition, user devices 110 do not usually report any identification information except their IP addresses. Therefore, monitoring of the network traffic and detection of the congestion is automated and managed by the controller 140 so that network can be optimized for end user's experience without the mobile user's knowledge.

In contrast to conventional inline TCP throughput monitoring devices that monitor every single data packets transmitted and received, the network controller 140 is an "out-of-band" computer server that interfaces with the steering device 130 to selectively inspect user flows of interest. The network controller 140 may further identify user flows (e.g., among the flows of interest) for optimization. In one embodiment, the network controller 140 may be implemented at the steering device 130 to monitor traffic. In other embodiments, the network controller 140 is coupled to and communicates with the steering device 130 for traffic monitoring and optimization. When queried by the steering device 130, the network controller 140 determines if a given network flow should be ignored, monitored further or optimized. Optimization of a flow is often decided at the beginning of the flow because it is rarely possible to switch to optimized content mid-stream once non-optimized content delivery has begun. However, the network controller 140 may determine that existing flows associated with a particular subscriber or other entity should be optimized. In turn, new flows (e.g., resulting from seek requests in media, new media requests, resume after pause, etc.) determined to be associated with the entity may be optimized. The network controller 140 uses the network state as well as historical traffic data in its decision for monitoring and optimization. Knowledge on the current network state, such as congestion, deems critical when it comes to data optimization.

In an embodiment, the network controller 140 is a moderator between the user device 110 and other components of the environment 100, such as the video optimizer 150 or the origin server 170. When the user device 110 transmits requests for videos or other related source files, the request may be intercepted by the steering device 130 and the flow routed through to the network controller 140 for further analysis. In some cases, the network controller 140 can determine that the requested source file can be further optimized to improve the overall capacity of the network 120. In some instances, the controller 140 may forward the intercepted request to the origin server 170 for the source file and intercept the response from the origin server 170 to determine information about the source file and whether to optimize the source file.

If the network controller 140 determines that the requested source file should be optimized, the network controller 140 determines optimization parameters for generating an optimized version of the source file. The optimization parameters specify attributes such as target bit rate, frame width, frame height, sample rate, audio properties and the like for transcoding the source file such that it is compatible with the user device 110 and meets the available bandwidth capacity of the network 120 and the user device 110. The network controller 140, in turn, provides the optimization parameters to a video optimizer 150 and redirects the user device 110 to the video optimizer 150 to retrieve an optimized version of the source file (e.g., that is transcoded according to the optimization parameters). If the network controller 140 determines not to optimize the requested source file, the network controller 140 may either continue to monitor the flow or instruct the steering device 130 not to route the flow through to the network controller 140.

The network controller 140 as shown includes a key generator 145 for generating a identification (ID) key that uniquely identifies request source files and optimization parameters describing how a video optimizer 150 should transcode the source file for the user device 110. To generate the ID key for the source file, the key generator 145 may determine a source file signature from source file information contained in a request intercepted from a device request 110 and/or source file information contained in a response intercepted from the origin server 170 that uniquely describes the requested source file. In an embodiment, the source file signature may comprise a hash of the original file or portion of the original file, attributes of the video (e.g., bit rate, frame width, frame height, sample rate, audio properties and the like), URL of the original file and so forth. In some instances, the URL may be modified such that the URL portion of the source signature is invariant to instances where a domain or website modifies or adds on additional parts in the URL. Additionally, to generate the key, the key generator 145 may receive optimization parameters determined by the network controller 140 for generating the optimized version of the source file. Through these parameters, the generated key can be used to identify particular optimized version of the source file that are stored in the cache of various video optimizers 150. In an embodiment, the generated key is transmitted along with the redirect request to the user device 110. The video optimizer 150 receives the ID key along with the redirected request for the source file. The video optimizer 150 may query its local cache 155 and the cache database 160 with the ID key to determine whether an optimized version of the source video file already exists locally or on another video optimizer.

The video optimizer 150 is a computer server that provides source file, such as video and image, optimization and delivers optimized video and image content to the user devices 110 via the network 120. The video and image optimization is an on-demand service provided through the transcoding of the video and image content. For example, when a user device attempts to retrieve video from the origin server 170, the network controller 140 may decide that the flow meets certain criteria for content optimization. The network controller 140 then redirected the user devices 110 to the video optimizer 150 to retrieve the optimized content. The video optimizer 150 receives optimization parameters and a location of the video or image content in the redirect request from the user devices 110 or from the network controller 140 and retrieves the video or image content from the corresponding origin server 170 for optimization and subsequent delivery to the user devices 110.

In an embodiment, the video optimizer 150 ingests source file content directly from an origin server 170 or other source and produces a reduced bit rate stream in real-time. The transcoded and optimized stream can be stored temporarily in a local storage, which may be referred to as a local cache 155. For example, the local cache 155 may be in the form of a serial ATA (SATA)/serial Attached SCSI (SAS) spinning or flash media. In some embodiments, the local cache 155 may be located physically within the video optimizer 150 and connected via a bus to the other components of the video optimizer 150 system. In other embodiments, the local cache 155 may be located outside of the video optimizer 150 and connected to the video optimizer 150 through a network 120 or other types of wired/wireless connections. Because each video optimizer 150 has a large amount of storage compared to the average size of an optimized source file stream, each video optimizer 150 is capable of caching some amount of optimized data. Several video optimizers 150 may be combined into a video caching cluster, where locally cached optimized source files may be shared between the individual video optimizers 150.

Because of the limited storage space in the local cache 155 of a video optimizer 150, the cache 155 is efficiently managed to ensure that the newer and/or more popular optimized versions of source files are available for distribution. The video optimizer 150 considers cached files for deletion according to one or more of the following: least recently used files, last access time, number of hits (e.g., total period and last period), number of duplication requests (e.g., trending up), size of file (e.g., larger files may be purged faster than smaller files to save room), or previously/recently purged (e.g., trending down). In an embodiment, the video optimizer 150 deletes cached files in small chunks over a long period of time in order to keep the system processor load necessary for deletion operations down to a minimum. In some instances, the video optimizer 150 can also wait to redirect all users accessing an active file prior to deleting the active file. Once the last user is redirected, the active file can be deleted without affecting a user's streaming experience. In some embodiments, the video optimizer 150 may push all of its cached files onto the cache database 160 for storage.

To more effectively manage the limited storage space in the local cache 155 of a video optimizer 150, the cache 155 may only store small segments or clips of an optimized source file. In an embodiment, the smaller segment may represent a preview of the optimized source file. Because users typically do not watch an entire video streamed to and played back on a user device 110, storing an entire optimized source file in the local cache 155 is an inefficient use of storage space. Thus, by storing only a portion of the source file as a video preview, many more optimized source files may be stored in the local cache 155. Furthermore, the video preview files stored in the local cache 155 may be retrieved and stitched to optimized portions of the corresponding source file when the user wishes to watch portions of the source file outside of the video preview segment stored in the local cache 155. If different segments of a source file have been stored as optimized video preview files in local caches 155 of different video optimizers 150, a single video optimizer 150 may also be able to retrieve the segments from the different local caches 155 and stitch the segments together, transcoding additional segments when necessary.

When the local cache 155 in the video optimizer 150 is modified (e.g., files are added, removed or updated), the video optimizer 150 issues a command to the cache database 160 to update the corresponding entry associated with the modified file. In an embodiment, the commands may comprise "cache add", "cache remove", "cache get" or "cache remove all". "Cache add" and "cache remove" are used to add or remove entries in the cache database 160, such as when optimized source files are updated/stored in the local cache 155 or when files are removed from the local cache 155. "Cache remove all" may be used to remove an entire set of entries associated with a particular video optimizer 150. This is particularly useful when a video optimizer 150 shuts down or crashes, in which case the entire cache may be lost. A "cache get" command is often accompanied with an ID key for querying the cache database 160 to identify an IP address of a given video optimizer 150 or server with the requested optimized version of the source file stored in its local cache 155. Other cache commands may be used in addition to the commands presented in these embodiments.

Figure 4:
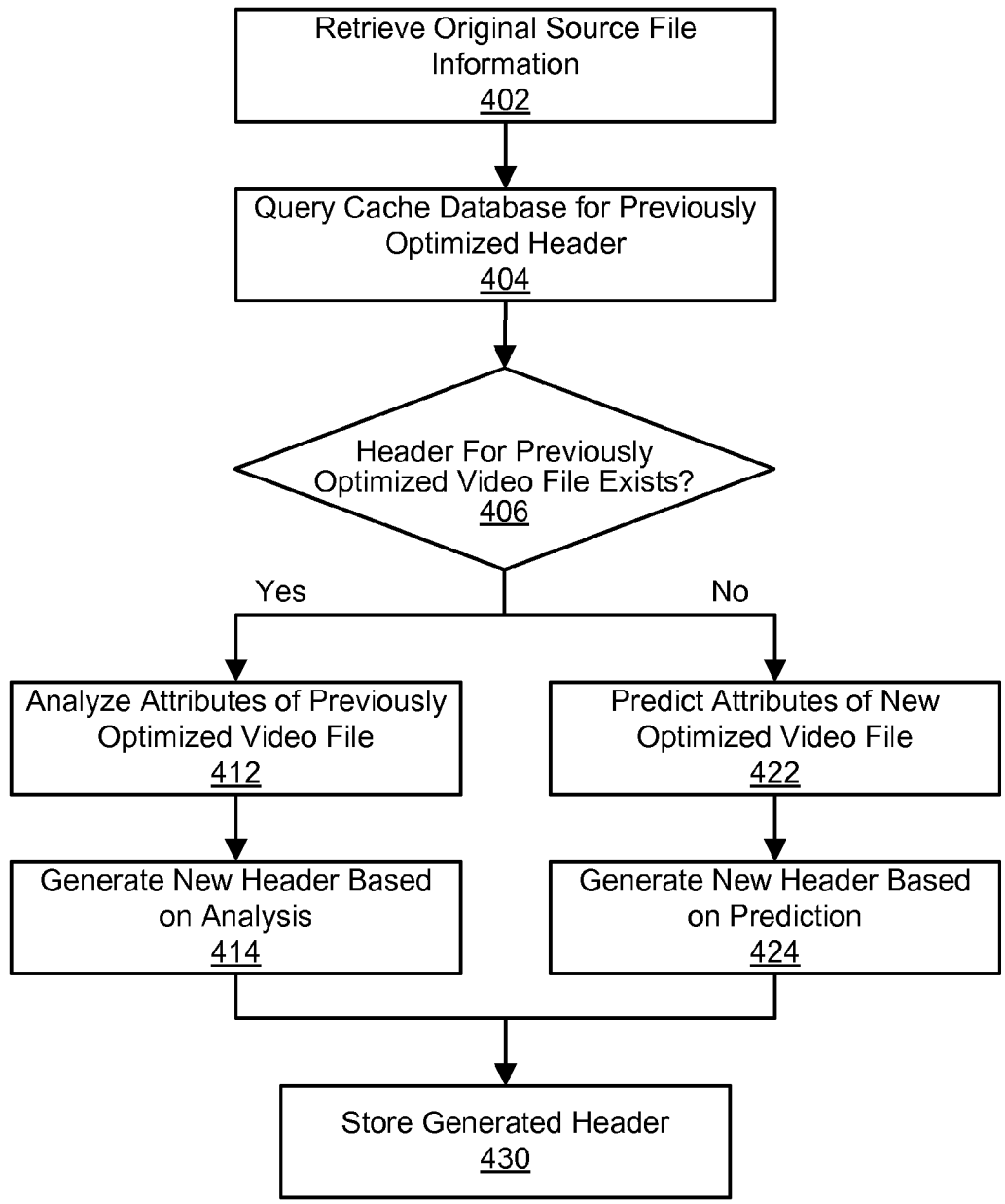
FIG. 4 illustrates a flow diagram of an embodiment of predictive encoding using cached headers.

In some embodiments, the local cache 155 may also be used for storing headers for optimized source files to be used in predictive encoding. Headers, which will be described in more detail in FIG. 4, are created prior to the start of a transcoding process and contain basic information related to the source file. Media players analyze header files in order to be able to recognize and play source files. When an optimized source file is first generated, the video optimizer 150 predicts the properties of the final optimized source file. Because the predictions are made prior to the transcoding process, the resulting header file may be inaccurate. Through predictive encoding, a video optimizer 150 may store generated headers in the local cache 155 after the transcoding process and retrieve the stored headers for use to generate a more accurate header file during future optimizations of the same source file.

The cache database 160 enhances the performance of the video optimizer 150 by eliminating the need to transcode source files that have already been previously optimized by another video optimizer 150. In an embodiment, the cache database 160 stores the location of locally cached optimized versions of source files in the optimization cluster in its database. In addition to the location of the cached optimized source file, the cache database 160 may also contain stored reference keys, last access times for each source file/optimized version and total number of hits/requests for each source file/optimized version. Information may be collected on the different optimized versions to identify those most often provided to user devices 110.

The cache database 160 can be a centralized resource/ server or it can be distributed among the video optimizers 150 themselves. When the cache database 160 receives a query for the location of an optimized source file based on an ID key corresponding to the source file and optimized version of the source file for transmission to the user device 110, the cache database 160 may search its database to identify the location of an optimized version of the source file having a matching reference key. The cache database 160 also receives commands from video optimizers 150 for updating the list of entries that it maintains for identifying and locating optimized source files in the video optimizer 150 clusters.

The disclosed embodiments focus on the caching of optimized versions of source files because video traffic makes up around half of all network traffic—and the percentage is growing every year. Therefore, optimizing video traffic massively reduces congestion in the network. By implementing an efficient method of caching optimized versions of source files, video optimizers would be freed from having to transcode source files that have otherwise been transcoded previously by another video optimizer. These freed video optimizers may be more effectively used in transcoding other requested source files, which overall provides users with a better streaming experience. By saving optimized source files in the local caches 155 of the video optimizers 150 and providing a cache database for searching through the various video optimizers, the system for optimized video caching streamlines the process of video optimization by having to primarily transcode source files that do not already have optimized versions. The cache database can also be used to manage the storage and caching of multiple optimized versions of source files through the entire video optimizer cluster such that heavily requested optimized versions of source files may be duplicated onto several video optimizers to lessen the number of requests routed to a single video optimizer.

The video optimizer 150, cache database 160 and origin server 170 are typically formed of one or more computer servers, which may include components and functionality described in more detail with reference to FIG. 2. While only one server of each video optimizer 150, cache database 160 and origin server 170 is shown in the environment 100 of FIG. 1, different embodiments may include multiple web servers and video servers operated by a single entity or multiple entities. In other embodiments, a single server may also provide different functionalities, such as delivering web content as a web server, as well as serving optimized video content. Steering device 130, network controller 140, and user devices 110 may also include components and functionality similar to those described in FIG. 2.

Computing Machine Architecture

Figure 2:
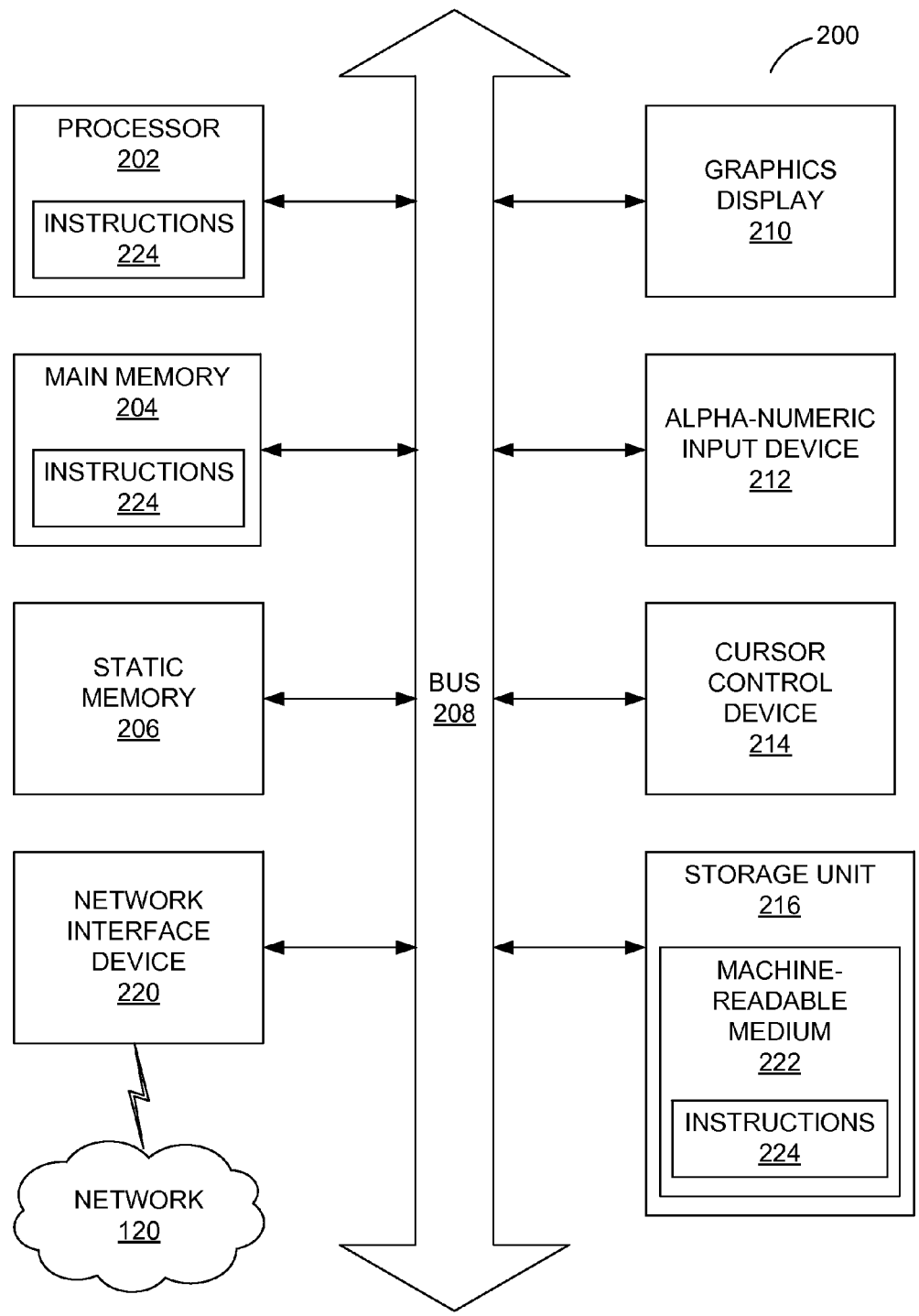
FIG. 2 illustrates an embodiment of components of an example machine able to read instructions from a machine-readable medium and execute them in a process or controller.

Turning now to FIG. 2, it is a block diagram illustrating components of an example machine able to read instructions from a machine-readable medium and execute them in a processor (or controller) to implement the disclosed system for on-demand real-time network monitoring and subscriber identification. Specifically, FIG. 2 shows a diagrammatic representation of a machine in the example form of a computer system 200 within which instructions 224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smart phone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes one or more processors 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 120 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Optimized Video Caching

Figure 3A:
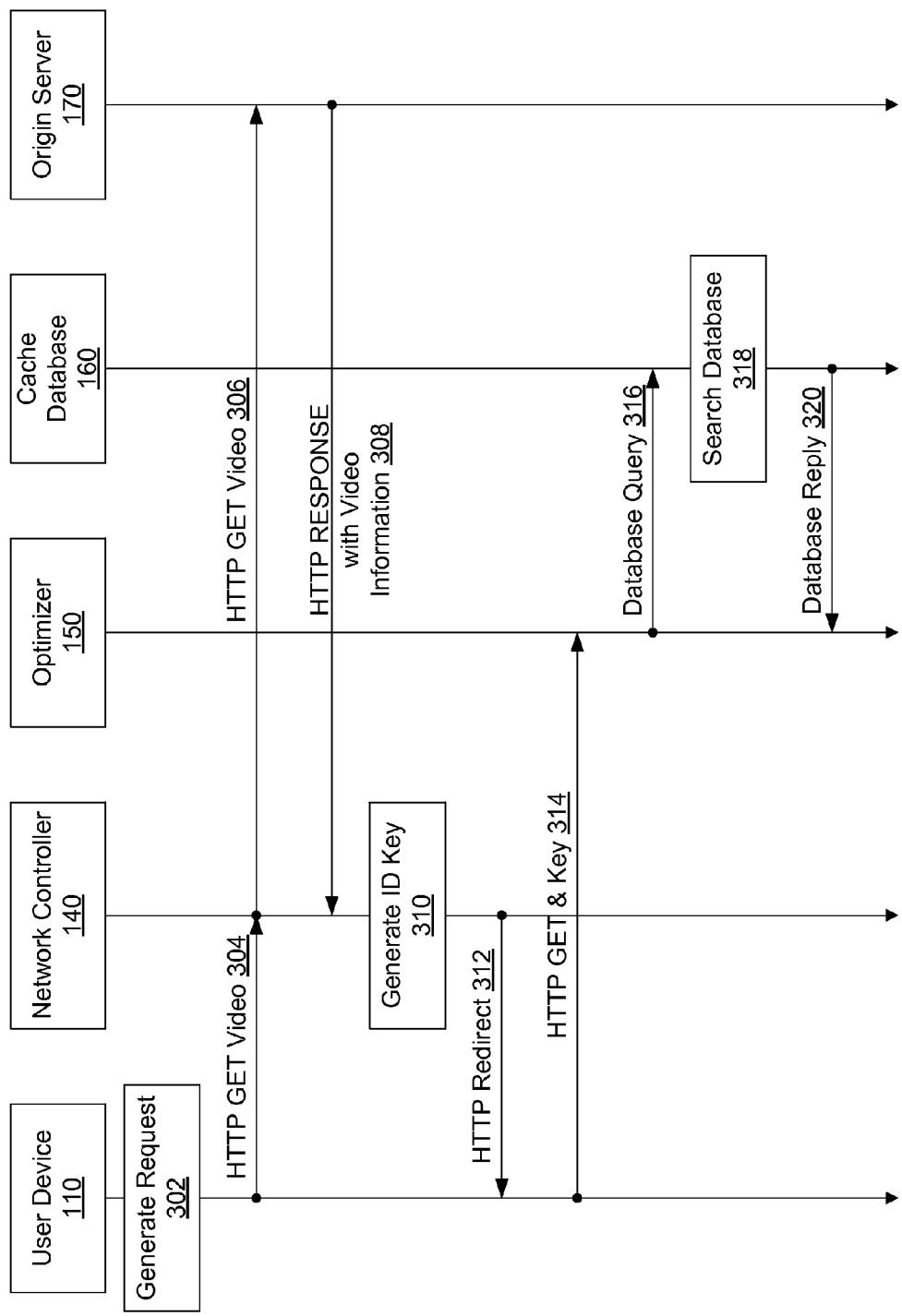
FIGS. 3A-3D illustrate embodiments of example event traces for providing an optimized video to a user device.
Figure 3B:
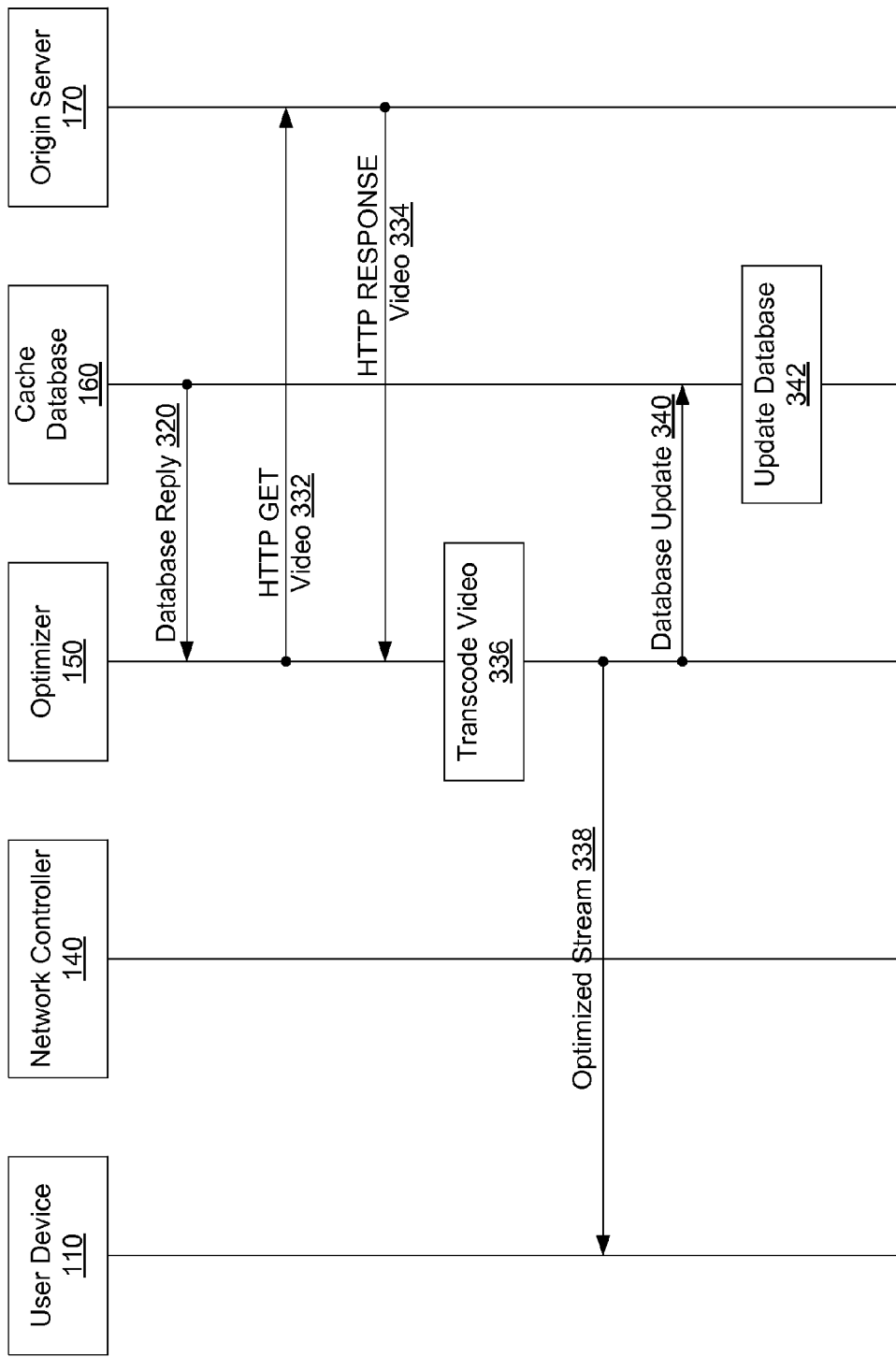
Figure 3C:
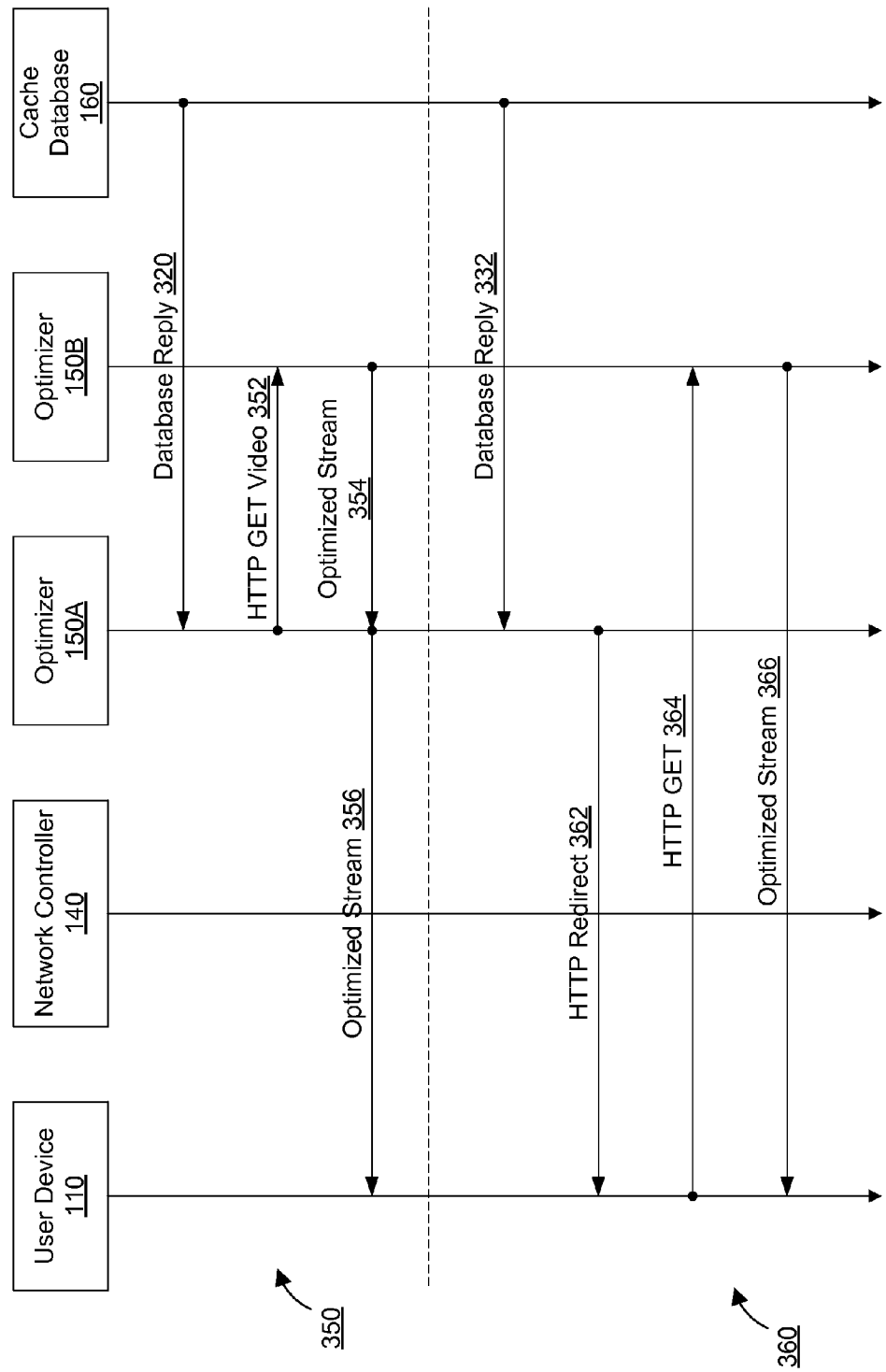
Figure 3D:
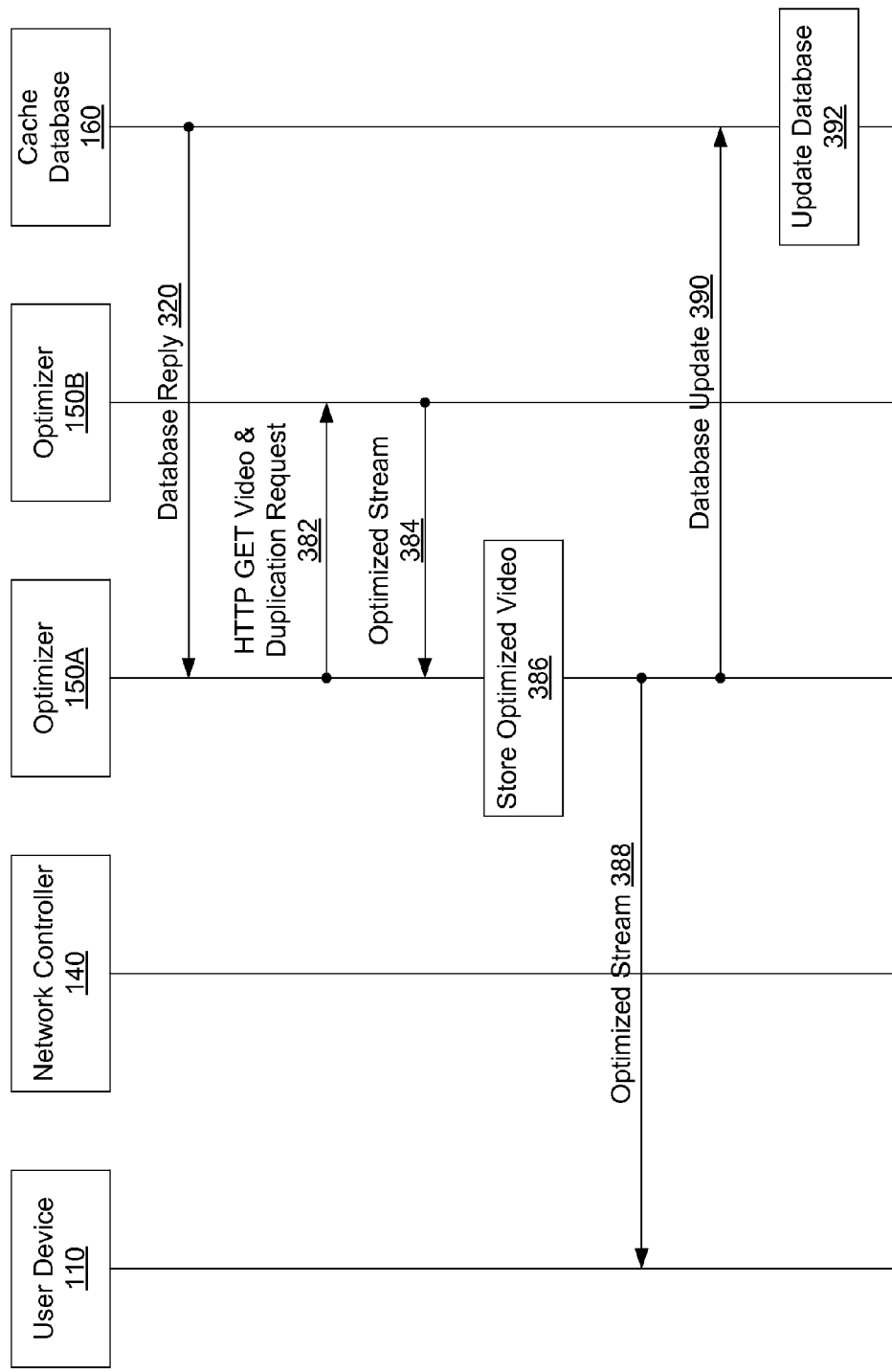

FIGS. 3A-D illustrate example event traces for providing an optimized video to a user device. FIG. 3A specifically shows an example of a source file request followed by a database query. FIGS. 3B-D show various embodiments of how video optimizers may react to different responses from the database. In some embodiments, the video optimizer can simply transcode the video itself, while in other embodiments, the video optimizer may have to redirect the request to other video optimizers. Shown are a user device 110, network controller 140, video optimizer 150, cache database 160, and origin server 170. A steering device (not shown in FIGS. 3A-3D) may manage traffic flow between one or more of the entities across a network 120. In FIGS. 3C and 3D, two video optimizers 150A and 150B exist. These video optimizers may operate independently of each other but may also share optimized source files stored in a shared local cache 155.

FIG. 3A is an example event trace illustrating a process for handling a source video request at a video optimizer. The process includes a user device 110, network controller 140, video optimizer 150, cache database 160 and origin server 170. The process starts when the user device 110 generates 302 a request from a user for a source file. For example, the user may browse an Internet site containing a video that the user wishes to view. The user device 110 generates 302 the request and transmits a HTTP GET video request 304 to retrieve the video source file content from the origin server 170. In an embodiment, the steering device 130 intercepts requests and responses associated with providing video to the user device 110. The steering device 130 redirects the video content request to the network controller 140, which forwards a modified HTTP Get video request 306 to the origin server 170. In the modification, the network controller 140 instructs that the origin server 170 respond with video information for the source file. By intercepting the HTTP RESPONSE with video information 308, the network controller 140 can determine whether a HTTP redirect instruction should be forwarded to the user device 110 in order to direct the user device 110 to a video optimizer 150 or whether the video content retrieved from the origin server 170 should be directly sent to the user device 110 (i.e., the video content does not need further optimization).

In response to receiving the HTTP RESPONSE with video information 308, the network controller 140 uses the received information in the HTTP GET Video 304 request and/or HTTP response 308 and determined information about the condition of the network and the user device from monitoring flows to generate 310 an ID key. The ID key comprises a source signature uniquely identifying the original source file on the origin server 170 and determined optimization parameters identifying an optimized version of the source file compatible with the user device and meeting the capabilities of the network.

The network controller 140 determines that the user device 110 can be redirected to a video optimizer 150 in order to obtain the optimized version of the source file, which may be generated directly by transcoding the source file or retrieved from a local cache 155 of a video optimizer 150. The network controller 140 determines a corresponding instruction for the HTTP RESPONSE request and sends a HTTP redirect instruction 312 along with the generated key to the user device 110. In an embodiment, the HTTP redirect instruction 312 may be a rewrite of the HTTP RESPONSE request 308. In other embodiments, the HTTP redirect instruction 312 may be instructions mapping to the received HTTP RESPONSE request 308 or a translation of the request 308. In an embodiment, the network controller 140 randomly chooses a video optimizer 150 to redirect a user device 110 to. In another embodiment, the network controller 140 acts as a load balancer and redirects the user device 110 based on the current processing load of each video optimizer associated with the network controller 140. For example, the network controller 140 monitors video optimizer 150 workloads and may redirect the user device 110 to the video optimizer 150 that has the most available processing capacity or least number of requests at the moment. Upon receiving the instructions, the user device 110 sends a HTTP GET request and the received key 314 to the video optimizer 150 that the network controller 140 indicated in its HTTP redirect instructions 312.

In an embodiment, once the video optimizer 150 receives the HTTP GET request along with the key associated with the original source file 314, the video optimizer 150 queries the cache database 160 to determine whether an optimized source file exists. The video optimizer 150 may also determine whether its local cache 155 contains an optimized version of the source video. The cache database 160 searches 318 its database based on the received key to determine whether the database contains any reference key entries that match the key. In an instance where a reference key entry matches the key, the cache database 160 sends a database reply 320 indicating that an optimized version of the source file exists on another video optimizer 150 and includes the location of the optimized source file. This is known as a cache hit and indicates that the video optimizer 150 does not have to transcode the source file in order to send an optimized version of the source file to the user device 110. In an instance where none of the reference key entries match the key, the cache database 160 sends a database reply 320 indicating that the requested optimized version of the source file is not stored in the cache of any video optimizers 150 reporting to the cache database 160. This is known as a cache miss and indicates that the video optimizer 150 has to transcode the source file in order to send an optimized source file to the user device 110.

FIG. 3B is an example event trace illustrating an embodiment of a process for providing an optimized source file to a user device in response to a cache miss. If there is a cache miss (e.g., the ID key does not match any reference key), the cache database 160 responds to the video optimizer's query by sending a database reply 320 indicating that no optimized version of the original source file exist in any of the caches in video optimizers 150 associated with the cache database 160. In response to this database reply 320, the video optimizer 150 has to transcode the original source file itself in order to provide an optimized version of the source file to the user device. The video optimizer 150 begins the transcoding process by sending a HTTP GET video request 332 to the origin server 170, requesting the original source file for transcoding. Once the video optimizer 150 receives the HTTP RESPONSE video content 334 from the origin server 170, the video optimizer 150 transcodes 336 the video to a format optimized and usable by the user device 110 according to the optimization parameters provided in the ID key. Thus, the optimization may be based on information the video optimizer 150 receives on the user device 110 regarding the user device's specifications and capabilities (e.g., screen size, processor, network connections, storage space, screen resolution, buffer, cache, operating system and the like) as well as the network properties (e.g., service provider, bandwidth, network congestion and the like).

In an embodiment, the video optimizer 150 streams the optimized video to the user device 110 as the video is transcoded in order to minimize the delay that the user may experience. In other embodiments, the optimized stream 338 may be slightly delayed by the video optimizer 150 so that the video optimizer 150 is able to build a buffer for instances when the transcoding may lag. When the video optimizer 150 transcodes a part of the source file, the video optimizer 150 sends a database update 340 to the cache database 160 to indicate that part of the optimized version of the source file is now available in the local cache 155 of the video optimizer 150 for future media content requests. The database update 340 may include the location of the optimized version of the source file in the local cache 155, the key comprising the source signature of the original source file retrieved from the origin server 170 and the parameters of the optimized version of the source file, and the segment of the original source file that is transcoded. In an embodiment, the video optimizer 150 may send the database update 340 before the entire video is optimized. Thus, if another request is received while the transcoding process is still underway, the segment of the video that has been transcoded may be provided to another video optimizer 150 for streaming to another user device 110. In response to receiving the database update 340, the cache database 160 updates 342 the database entries so that the cache database 160 can identify the location of optimized version of the source file for responding to future database queries.

FIG. 3C is an example event trace illustrating embodiments of a process for providing an optimized source file to a user device in response to a cache hit. In FIG. 3C, two video optimizers 150A and 150B exist to illustrate the data transfer that is possible between a network of video optimizers. Each of these video optimizers 150A, 150B are functionally identical to the video optimizer 150 presented previously, but each video optimizer 150A and 150B may have different optimized source files stored in their local caches 155. In response to a cache hit (e.g., the ID key matches a reference key), the cache database 160 responds to the first video optimizer's query to identify an optimized version of the source file by sending a database reply 320 and 332 indicating that an optimized version of the original source file is located in a local cache 155 of video optimizer 150B associated with the cache database 160.

In an embodiment of the process 350 for handling a cache hit, the first video optimizer 150A may retrieve or stream the optimized version of the source file from video optimizer 150B and, in turn, stream the optimized source file itself to the user device 110. In this embodiment, the first video optimizer 150A may send a HTTP GET video, or other request 352 for retrieving the optimized version of the source file to the second video optimizer 150B. Upon receiving the request 352, the second video optimizer 150B provides an optimized stream 354 to the first video optimizer 150A. In an embodiment, the first video optimizer 150A may locally cache the received optimized version of the source file as it transmits the optimized stream 356 to the user device 110. For example, the video optimizer 150A may locally cache an optimized version of a frequently requested source file. Through this process, the first video optimizer 150A locally caches the portion of the optimized stream 356 received from video optimizer 150B for future streaming purposes. In another embodiment, the first video optimizer 150A may forgo caching the received optimized stream 354 and choose to only forward the optimized stream 356 to the user device 110. For example, the first video optimizer 150A may not store the optimized stream in response to determining that the optimized source file is not requested frequently or that the local cache 155 is already full. Statistics for optimized versions of a source file may be maintained individually at the video optimizers 150 themselves and/or at the cache database 160, which may provide the statistics with responses to queries.

In another embodiment, the first video optimizer 150A may decide to redirect the user device 110 to retrieve the optimized source file from the second video optimizer 150B instead of forwarding 354, 356 the optimized stream. By redirecting the user device 110 to retrieve the optimized source file from the second video optimizer 150B, the first video optimizer 150A frees up processor loads and network bandwidths to process other media requests. The first video optimizer 150A sends an HTTP redirect instruction 362 to the user device 110, indicating the video optimizer where the desired optimized source file may be located. The user device 110 then transmits a HTTP GET request 364 to the second video optimizer 150B that was indicated in the HTTP redirect instruction, requesting the second video optimizer 150B stream the requested optimized source file. In response to the HTTP GET request 364, the second video optimizer 150B transmits the optimized stream 366 to the user device. In some embodiments, the first optimizer 150A generates an HTTP redirect including the generated ID key, which the second optimizer 150B uses to identify the optimized version of the source file in its local cache 155. The second optimizer 150B may generate another database query 316 as explained previously with reverence to FIG. 3A.

In some instances, a cache hit error may occur due to various different factors. In one example, the source signature, ID key or reference entry stored in the cache database 160 may be mismatched to the optimized version of the source file stored in a video optimizer 150. For example, the cache database 160 may have erroneously saved or corrupted an entry or the video optimizer 150 may have experienced an error in which the locally cached optimized version of the source file was corrupted or deleted. In another embodiment, the video optimizer 150 may send instructions to the cache database 160 requesting that the entry is deleted. Each video optimizer 150 associated with the cache database 160 may also synchronize locally cached resources with the entries stored in the cache database 160 periodically to determine whether entries need to be flushed from the cache database 160.

In another embodiment, a first video optimizer 150A may be redirected by the cache database 160 to a second video optimizer 150B that has a certain optimized source file. However, the second video optimizer 150B may be unavailable for some reason, such as due to a server crash or network connection issues. The first video optimizer 150A may respond by notifying the cache database 160 that the second video optimizer 150B is unavailable. In response, the cache database 160 may temporarily remove the second video optimizer 150B from its set of available server resources until the second video optimizer 150B syncs with the cache database 160 or responds to a request from another video optimizer 150.

In some embodiments, the first video optimizer 150A may detect that an error has occurred, such as the second video optimizer 150B not having the optimized file that a cache database 160 reported the second video optimizer 150B as having. In response to the error, the second video optimizer 150B may compare its current server load with that of the first video optimizer 150A to determine which has more bandwidth. If the first video optimizer 150A is less loaded than the second video optimizer 150B, then the first video optimizer 150A can transcode and optimize the source file. If the second video optimizer 150B is less loaded than the first video optimizer 150A, then the second video optimizer 150B can transcode and optimize the source file. In some embodiments, the video optimizers 150 may also compare connection quality or proximity to the client as deciding factors on which video optimizer 150 transcodes the source file. The video optimizers 150 may also send a database update instruction to the cache database 160 to update the entries related to the locations of cached optimized source files.

FIG. 3D is an example event trace illustrating an embodiment of a process for providing an optimized source file to a user device and duplicating the optimized source file in response to a cache hit. Similar to FIG. 3C, FIG. 3D includes a user device 110, network controller 140, first video optimizer 150A, second video optimizer 150B and cache database 160. In response to a database query by the first video optimizer 150A, the cache database 160 sends a database reply 320 indicating that a second video optimizer 150B has the requested optimized source file. In an embodiment, the first video optimizer 150A may duplicate the optimized version of the source file stored on the second video optimizer 150B in its local cache 155. For an example, the first video optimizer 150A may determine that the specific optimized version of the source file is often requested and would save processing time if the optimized version of the source file was stored and cached locally. The optimized version of the source file may experience a high hit rate, overwhelming a single video optimizer 150 storing the optimized version of the source file. Accordingly, another optimizer requesting an optimized version of a source file with a high hit rate may request to do duplicate the optimized version for storage within its local cache 155 to prevent the single server from being overwhelmed. By duplicating the optimized source file, the video optimizers load balance requests among the video optimizers reporting to the cache database 160. In another example, the requested optimized source file may represent only a segment of the original source file's total playback length. The first video optimizer 150A may submit requests to multiple video optimizers 150 to collect as many optimized segments of the original source file as possible before transcoding remaining unoptimized segments. Optimized source file stitching is discussed below in conjunction with the video preview cache.

In an embodiment, the first video optimizer 150A sends a HTTP GET video request and a duplication request 382 to the second video optimizer 150B that has the desired optimized version of the source file. In response to the request, the second video optimizer 150B sends the optimized stream 384 to the first video optimizer 150B. In another embodiment, the first video optimizer 150A sends a HTTP GET video request without requesting a duplication of the optimized version of the source file. In response to the request, the second video optimizer 150B may determine that it is overloaded with requests or transcoding processes. The second video optimizer 150B may respond to the first video optimizer 150A by sending the optimized stream to the first video optimizer 150A as well as a request for the first video optimizer 150A to store 386 the duplicated optimized video. As the first video optimizer 150A receives the optimized stream 384, it stores 386 the optimized version of the source file in a local cache 155 while sending the optimized stream 388 to the user device 110 for playback. Since the first video optimizer 150A now possesses a locally cached version of the optimized source file, the first video optimizer 150A sends instructions for a database update 390 to the cache database 160. In response to the received instructions, the cache database 160 updates 392 the database to add an entry indicating that both video optimizers 150A and 150B have the specific optimized version of the source file cached locally.

Video Preview Cache

An additional possibility with optimized video caching is a video preview cache. Rather than locally caching a large number of full-length optimized versions of source files at a video optimizer 150, an even greater number of partial-length optimized versions may be stored. Thus, each video optimizer 150 may directly begin to handle a larger number of requests without having to begin a transcoding process or stream the optimized version from another optimizer. For example, if the video optimizer 150 stores 1 minute portion of an optimized version of a source file requested by the user device 110, when a user abandons the video (e.g., in the first 30 seconds) before a transcoding process or streaming process needs to take place to seamlessly deliver the stream, no additional processing is required. Thus, the preview cache may store the first 30-60 seconds of an optimized version to reduce requests and bandwidth used on the network because a large number of users do not view past the initial segments. Thus rather than spending the additional processor bandwidth transcoding and storing segments of a source file that users often do not watch, the video optimizer 150 can more efficiently manage its content by creating short optimized video previews. A shorter optimized video also allows more optimized versions of source files to be stored in the same limited storage cache in the video optimizer 150. Popular files may still be stored in full-length optimized versions but purged and updated more frequently to follow user trends.

In an embodiment, the video optimizer 150 begins to transcode a source file and streams the optimized source file to the user device 110. When the user cancels playback on the user device 110, the video optimizer 150 stops optimizing the source file and stores the segment that is already optimized. The video optimizer 150 may update the cache database 160 with an entry indicating the source file that was optimized, a key associated with the original source file, and also the segment of the video that is optimized. If later users request the same segment of the source file, the cache database 160 can redirect the requesting video optimizer 150 to the correct local cache 155 that contains the optimized video segment. In other embodiments, a portion of the optimized version of a source file may be distributed among the various video optimizers 150.

In some embodiments, the user may request a segment of a source file that has not been fully optimized. In this embodiment, the video optimizer 150 may determine the video segments that have been optimized already so as to prevent having to re-transcode an already existing optimized segment of the source file. As the video optimizer 150 streams the optimized video segments to the user device, it continues to monitor whether the video transcoding process is approaching a segment that has not previously been optimized. The video optimizer 150 may begin transcoding the portion of the source file that is not optimized from any key frame and continue transcoding until it reaches the beginning of a previously optimized video segment. Prior to or when the transcoding process reaches the beginning of a previously optimized video segment, the video optimizer 150 requests the previously optimized video segment from another video optimizer where the segment is stored. In response to the request, the other video optimizer sends the requested optimized video segment to the initial video optimizer 150, which stitches the received optimized video segment with the segment the video optimizer itself transcoded at the last key frame.

For example, three consecutive video segments may be cached in a cluster of video optimizers 150, each video optimizer 150 holding a different segment. A first video optimizer may stream a stored preview from the optimized version of the source file and subsequently retrieve the source file beginning from a last key frame of the stored preview and transcode the source file from the last key frame, stitching the newly transcoded stream at the key frame to provide seamless playback on the user device 110. The first video optimizer continues transcoding the source file and streaming the optimized version until it reaches the beginning of an optimized video segment identified on another video optimizer. The first video optimizer may then retrieve the segment that has already been transcoded from the corresponding video optimizer. The first video optimizer 150 may continue requesting segments from the other video optimizers until the user stops watching the video or no optimized segments are available for a portion of the source file. In the case where no optimized segments are available for a portion of the source file, then the initial video optimizer 150 transcode the source file from where the last optimized segment left off. If desired, the video optimizer may also locally cache the entire stream in order to make it available for future optimized video requests.

During local cache management, the video optimizer 150 may decide to flush only portions of optimized versions of source files in order to create empty space in a storage drive for other optimized versions of source files. For example, a 30 minute optimized version of source file may be segmented and processed so that only the first minute of the optimized version of source file is saved while the rest of the optimized version of source file is purged from the local cache 155. Local cache 155 purging frees up large amounts of storage space while still preserving a fast response and initial streaming time for the user, especially for optimized versions of source files that are less popular than others. In response to the deletion and other cache management operations, the video optimizer 150 sends a database update to the cache database 160 to update the entries stored in the database.

Predictive Encoding Improvement

FIG. 4 illustrates a flow diagram of an embodiment of predictive encoding using cached headers. In an embodiment, the process shown in FIG. 4 is performed by the video optimizer 150 for source files comprising headers. For example, headers may be generated for MP4 files, AVI files, MPEG files, MOV files, MKV files, OGM files, and other types of media files. For clarity, MP4 source files and headers are referred to in the following description but other types of media files may also apply. When optimized versions of MP4 source files are generated, a predictive header is created prior to the start of the transcoding process based on the original source file and/or the original source file header. The predictive header contains basic information related to the source file in order for media players to recognize and play the optimized version of the source file. For example, the predictive header may contain information such as source profile, frame/sample rates, frame type, size of output sample, size of each output frame, encoding used, compression and so forth. Because the predictive header is created prior to the source file being entirely transcoded to allow real-time streaming, the video optimizer 150 must predict information to insert into the header. As a result, the header may contain overestimations or underestimations of the media container size necessary for transcoding the frames in the transcoded media. To compensate for underestimations of frame size, the video optimizer 150 may have tore-transcode frames to reduce their quality and thus size, which may cause distortions in the optimized version of the source file and require additional processing time. To compensate for overestimations of frame size, redundant bits or data may be added to a frame to pad the frame in order to meet the pre-specified size. Thus, the optimized version of the source fill may contain frames that are over optimized.

The distortions and differences in estimated quality may be reduced by performing multiple passes on transcoding the source file, with each pass using the predictive header previously generated to more accurately predict the new header data for the next pass. The video optimizer 150 may fix errors in header generation by reducing the padding necessary in some frames while smoothing the quality of the entire optimized source file. By reducing the padding in optimized source file, the video optimizer 150 is also able to reduce the storage space needed to locally cache the optimized source file. However, because video transcoding and optimization is often performed on-the-fly, it is not feasible for the video optimizer 150 to perform a multi-pass on the original source file. Additionally, these passes should not occur needlessly and thus may only be performed when required to provide a source file to a user device 110.

In an embodiment, optimized video caching provides a system for improving predictive encoding. When an original source file is first transcoded, a predictive header is generated in the conventional method that involves using predictive algorithms on the source file or a small portion of the source file and/or the header of the source file to make a best guess on the characteristics of the output optimized version of the source file. The predictive header can be stored along with the optimized version of the source file in the cache of an video optimizer 150 or in the cache database 160 with a key corresponding to the optimized version of the source file and can also be retrieved for use in improving later header predictions. The predictive headers stored subsequent to the transcoding of the source file may be updated to include information relative to the optimized version of the source file generated during transcoding. For example, the updated predictive header may include actual frame sizes of the optimized version, initial frame sizes of the source file, last frame sizes that required re-transcoding due to too large a size, and number of times the predictive header has been updated for the optimized version of the source file. Thus, later transcoding processes may yield improved optimization and higher quality compared to the first pass and, if a threshold number of passes have been completed, a video optimizer 150 may utilize the predictive header information directly without performing another pass.

As illustrated through FIG. 4, when a video optimizer 150 receives a request to transcode a source file, the video optimizer 150 retrieves 402 the original source file from the origin server 170 and also receives the original source file header as well. In response to receiving the original source file header and ID key, the video optimizer 150 queries 404 the cache database 160 to determine whether the cache database 160 has the location of any corresponding previously optimized version of the source file and header. In a database reply, the cache database 160 determines 406 whether an optimized version of the source file and associated header are located in the local cache 155 of another video optimizer, header information has been cached but the requested optimized version of the source file does not exist in any local cache 155, or that the both an optimized version of the source file and associated header do not exist in the video optimizer cluster. In the latter case, the transcoding process may proceed as described with reference to FIGS. 3A-D with the header information for the source file and/or the predictive header information for the first pass optimized version (and updated header information based thereon) stored locally or updated in the cache database 160 for future use by the video optimizers 150. In some embodiments, predictive header information for a same source file but different optimized version may be used to aid in generating a new optimized version of the source file of higher or lower quality.

In an embodiment where an optimized source file and associated header are available in the cache database 160 and/or at another video optimizer, the initial video optimizer 150 may retrieve 402 original source file header information and/or the ID key generated for the source file and query 404 the cache database 160 to retrieve any previously generated predictive header and optimized version of the source file information. If the initial video optimizer 150 receives previously generated predictive header and optimized version of the source file information, the initial video optimizer 150 determines whether the optimized version of the source file should be re-transcoded in order to improve the quality of the optimized version with another pass, or to generate a different optimized version, (e.g., of a different quality level) prior to streaming to the user device 110.

The video optimizer 150 analyzes 412 the attributes of the header and file to generate 414 a new predictive header based on the analysis. In an embodiment, the video optimizer 150 may use predictive algorithms to analyze 412 the optimized source file header, the optimized version of the source file, the original source file and/or the original source file header to better determine information in the new predictive header. Thus, with each subsequent pass, a previously generated header may be analyzed 412 to fine tune the new session's predictive algorithm to generate a more accurate header for the optimized version of the source file. The newly generated header is then stored 430 with the optimized source file and updated in the cache database 160 for later optimized video requests and predictive encoding operations In order to aid in future predictive encoding operations, the video transcoder 150 may record information about the transcoding process and update 430 the predictive header to include information such as actual frame sizes of the optimized version, initial frame sizes of the source file, last frame sizes that required re-transcoding due to too large a size, and number of times the predictive header has been updated for the optimized version of the source file.

In the instance where no previous optimized source file header exists 406, the video optimizer 150 predicts 422 the attributes for the new optimized source file using its best guess. Using this method, the video optimizer 150 will often create inaccuracies in the generated 424 header based on the predictions, resulting in overestimations or underestimations of optimized video frame sizes. As mentioned previously, the video optimizer 150 has to reduce the quality of frames to compensate for underestimations and pad the frames with redundant bits for overestimations. While later passes may reduce these errors, it is often infeasible for the video optimizer 150 to perform a second pass during a streaming operation. The newly predictive header is stored 430 with the optimized source file for later optimized video requests and predictive encoding operations. In order to aid in future predictive encoding operations, the video transcoder 150 may record information about the transcoding process and update 430 the predictive header to include information such as actual frame sizes of the optimized version, initial frame sizes of the source file and last frame sizes that required re-transcoding due to too large a size.

Additional Configuration Considerations

The disclosed configurations beneficially allow optimized source files to be quickly retrieved and streamed to user devices without requiring an optimizer to re-transcode source files by introducing a cache database. In conventional systems, source files are either streamed to the user device without any optimization, which is an inefficient use of limited network bandwidth, or source files are optimized every time a user requests a source file, which is an inefficient use of the processing capacity for each optimizer. Because optimizers are often separate and operate independently of each other, introducing a cache database allows a central management catalog for determining which local caches contain certain optimized source files. Optimized source files can thus be provided to users quicker and without the need for re-transcoding.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors 102) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods (e.g., as described with FIGS. 3A-D and 4) described herein may be performed, at least partially, by one or more processors (e.g., processor 202) that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory 204). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing interactive video ad with an HTML underlay through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for optimized video caching comprising:
    maintaining, by a video optimizer, a cache database including a plurality of reference keys corresponding to a plurality of optimized versions of one or more source files stored on a plurality of video optimization servers, each reference key specifying parameters of an optimized version of a source file and including an identifier of the source file and an identifier of a video optimization server storing the optimized version of the source file;
    receiving a request at the video optimizer to optimize an original source file from a client device, the original source file stored on an origin server and the request including a key specifying parameters for optimizing the original source file and an identifier of the original source file;
    generating a query, based on the key, to the cache database;
    receiving, from the cache database, a response indicating whether the key matches a reference key maintained in the database; and
    transmitting to the client device, responsive to the cache database response indicating the key matches the reference key, a redirect request comprising the key and an address of the video optimization server specified by the reference key for the client device to request the optimized version of the original source file.

2. The method of claim 1, further comprising, responsive to the cache database response indicating that the key matches the reference key:
    transmitting, to the video optimization server specified by the reference key, a request for the optimized version of the original source file stored on the video optimization server.

3. The method of claim 2, further comprising:
    storing the portion of the received optimized version of the source file.

4. The method of claim 2, further comprising:
    transmitting, with the request for the optimized version of the original source file stored on the video optimization server specified by the reference key, a request to duplicate the optimized source file stored on the video optimization server on the video optimizer; and
    transmitting, to the cache database, instructions for updating the cache database in response to storing the optimized version of the original source file stored in the video optimizer.

5. The method of claim 4, further comprising:
    querying the origin server to determine whether the stored optimized version of the original source file matches the video length of the original source file.

6. The method of claim 1, wherein the key comprises a source signature, the source signature being a hash of a portion of the original source file.

7. The method of claim 1, wherein the cache database comprises data entries identifying a plurality of optimization servers storing an optimized version of the original source file, the entries being modified through instructions transmitted to the cache database to update a location where the optimized version of the original source file is stored.

8. The method of claim 1, wherein the stored optimized version of the original source file comprises a predefined segment of the entire generated optimized source file.

9. The method of claim 1, further comprising, responsive to the cache database response indicating that the key does not match any reference key for an optimized version of the original source file:
    transmitting, to the origin server, a request for the original source file;
    streaming, from the origin server, the original source file;
    generating the optimized version of the original source file by transcoding the stream based on predetermined transcoding settings and storing the optimized version of the original source file;
    streaming the optimized version of the original source file for playback on the client device; and
    transmitting, to the cache database, instructions for updating the cache database with a reference key corresponding to the optimized source file stored at the optimization server.

10. The method of claim 1, wherein the key matches the reference key responsive to the identifier of the original source file in the key matching the identifier of the source file in the reference key and the optimization parameters specified by the key matching the parameters of an optimized version of the source file.

11. A system for optimized video caching, comprising:
a processor; and
a non-transitory computer-readable storage medium storing executable computer program instructions that when executed causes the processor to:
maintain, by a video optimizer, a cache database including a plurality of reference keys corresponding to a plurality of optimized versions of one or more source files stored on a plurality of video optimization servers, each reference key specifying parameters of an optimized version of a source file and including an identifier of the source file and an identifier of a video optimization server storing the optimized version of the source file;
receive a request to optimize an original source file from a client device, the original source file stored on an origin server and the request including a key specifying parameters for optimizing the original source file and an identifier of the original source file;
generate a query, based on the key, to the cache database
receive, from the cache database, a response indicating whether the key matches a reference key maintained in the database; and
transmit to the client device, responsive to the cache database response indicating the key matches the reference key, a redirect request comprising the key and an address of the video optimization server specified by the reference key for the client device to request the optimized version of the original source file.

12. The system of claim 11, further comprising instructions that cause the processor to, responsive to the cache database response indicating that the key matches the reference key:
transmit, to the video optimization server specified by the reference key, a request for the optimized version of the original source file stored on the video optimization server.

13. The system of claim 11, further comprising instructions that cause the processor to, responsive to the cache database response indicating that the key does not match any reference key for an optimized version of the original source file:
transmit, to the origin server, a request for the original source file;
stream, from the origin server, the original source file;
generate the optimized version of the original source file by transcoding the stream based on predetermined transcoding settings and storing the optimized version of the original source file;
stream the optimized version of the original source file for playback on the client device; and
transmit, to the cache database, instructions for updating the cache database with a reference key corresponding to the optimized source file stored at the optimization server.

14. The system of claim 11, wherein the key matches the reference key responsive to the identifier of the original source file in the key matching the identifier of the source file in the reference key and the optimization parameters specified by the key matching the parameters of an optimized version of the source file.

* * * * *